United States Patent [19]

Millard et al.

[11] Patent Number: 4,486,372
[45] Date of Patent: Dec. 4, 1984

[54] METHOD FOR FABRICATING CONTOURED PERFORATED COMPOSITE LAMINATE STRUCTURE

[75] Inventors: Ernest C. Millard; William D. Brown, both of Riverside County, Calif.

[73] Assignee: Rohr Industries, Inc., Chula Vista, Calif.

[21] Appl. No.: 537,790

[22] Filed: Sep. 30, 1983

[51] Int. Cl.³ .............................................. B29G 5/00
[52] U.S. Cl. ...................... 264/137; 156/242; 156/245; 156/246; 264/156; 264/258; 264/316
[58] Field of Search ............... 156/242, 252, 253, 285, 156/245, 246; 428/134–137, 247, 250; 264/156, 258, 90, 255, 257, 316, 324, 137

[56] References Cited

U.S. PATENT DOCUMENTS

| | | | |
|---|---|---|---|
| 2,289,177 | 7/1942 | Chandler | 428/247 |
| 3,177,970 | 4/1965 | Boschi | 428/137 |
| 3,787,546 | 1/1974 | Pratt et al. | 156/242 |
| 3,966,522 | 6/1976 | Hatch et al. | 156/148 |
| 4,211,590 | 7/1980 | Steward et al. | 156/79 |
| 4,292,105 | 9/1981 | Taylor | 156/242 |

Primary Examiner—George F. Lesmes
Assistant Examiner—P. R. Schwartz
Attorney, Agent, or Firm—Patrick J. Schlesinger; Frank D. Gilliam

[57] ABSTRACT

A method of forming perforations in composite laminates by impregnating the material with a modified epoxy resin by means of hot melt or solvent methods. The resin is then allowed to dry. The epoxy impregnated material is then warmed to around 165° F. and forced by a resilient pressure pad over a tool having a plurality of upstanding studs or pins. While in position on the pin tool, the laminate is then partially cured by combined heat and pressure to minimize resin flow while retaining the ability to be formed to a final contour in a contoured curing fixture after removal from the pin tool. Controlled partial cure and selected low flow resin systems prevent resin flow into the formed apertures formed by the pin tool during final resin cure.

3 Claims, 2 Drawing Figures

METHOD FOR FABRICATING CONTOURED PERFORATED COMPOSITE LAMINATE STRUCTURE

BACKGROUND OF THE INVENTION

This invention relates to an improvement in fabricating perforated composite laminate structure and, more particularly, but not by way of limitation, to a method of fabricating perforated composite laminate structures into predetermined contoured shapes.

The manufacture of composite laminate panels, such as acoustic surface panels, made from epoxy resin impregnated woven graphite fabric or the like requires some means for providing porosity through the panel. The drilling or piercing of holes through the panels after the sheet has been cured is costly and tends to reduce the mechanical properties of the acoustical panel system. For example, because the fibers of the reinforcing material are rigidly held in the cured sheet, drilling or punching apertures will tend to break a portion of the strands of such reinforcing material, particularly if the panel is laminated with a series of superimposed sheets. The problems are particularly acute when it is desired to contour the final panel structure is to a particular configuration.

Further, for aerospace applications it is necessary to provide complex shapes and the prior art while providing generally adequate composite acoustic sheets only provided flat panels and could not provide cured or complex curved perforated acoustic sheets.

Prior art methods of producing various forms of perforated sheet material from resin impregnated cloth material are taught by U.S. Pat. Nos. 2,289,177; 3,704,194; and 3,787,546.

U.S. Pat. No. 2,289,177 by F. J. Chandler teaches perforating partially cured flexible composite material.

U.S. Pat. No. 3,704,194 by S. C. Harrier teaches providing perforations in reinforced plastic members by first pressing a partially cured sheet, or series of sheets, over spaced apart, pointed, partially elastic, studs projecting from a mold surface portion. The sheet is then finally cured while pressed against the mold surface portion.

U.S. Pat. No. 3,787,546 by Pratt et al., teaches making a perforated resin plastic sheet on a studded mold by pressing a partially cured plastic sheet over the studs so that the studs project through the sheet. A pressure through a medium holds the sheet against the mold surface while final curing takes place.

None of the noted patents could provide curved or complex curved perforated composite sheets particularly adapted for the stringent requirements of acoustic aerospace applications.

SUMMARY OF THE INVENTION

The method of the present invention is directed to the manufacture of a perforated laminate article on a flat rigid studded mold. The method comprises first pressing a heated and dried resin impregnated laminate sheet over the rigid studs or pins of the mold so that they project through the sheet. The studs or pins deflect the strand of the laminate sheet or sheets as they pass through thereby not breaking the strands and weakening the strength of the sheet. A flexible pressure transmitting material with stud or pin indentations for mating with the exposed ends of the studs or pins is then held against the adjacent sheet surface while the resin is partially cured and compacted. The now perforated and partially cured sheet is then removed from mold and placed on the surface of a fixture contoured to the desired form of the to be cured sheet. The sheet is then finally cured in the contoured configuration. During the cure cycle porosity is maintained as the chosen rheological characteristics of the resin epoxy material are such that they inhibit flow into the perforations formed by the studs or pins, while allowing adequate flow for final laminate compaction and acquisition of contour.

An object of this invention is to provide a method for making a perforated reinforced composite laminate sheet in which the perforations are created on a flat mold while the sheet is partially cured condition (B staged) and then taken from the mold and placed on the surface of a contoured tool where final cure is accomplished while maintaining the perforations.

This and other objects and advantages of the invention will be more fully understood from the following detailed description which is meant to be typical of rather than limiting on the scope of the invention.

DETAILED DESCRIPTION OF THE DRAWINGS

Figure 1:
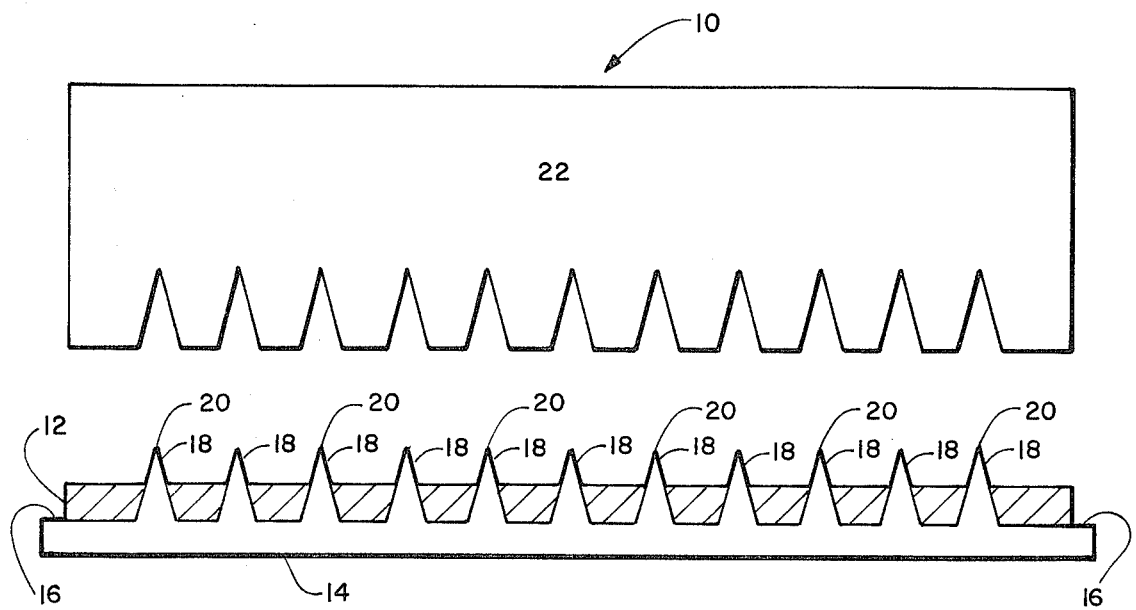
FIG. 1 depicts an end view schematic showing of a mold with projecting pins and a mating resilient pressure pad.

Referring now to the drawings it detail and specifically to FIG. 1, a tool system 10 for the perforating and partial curing of a resin impregnated laminate of woven fabric material 12 is shown. The woven fabirc material 12 may be constructed from graphite or any other suitable material. The base 14 of the tool system 10 comprises a rigid flat upper surface 16 containing a plurality of spaced apart upstanding suitable contoured studs or pins 18. The studs or pins 18 are pointed at their distal ends 20 to assist in the penetration of the dried resin impregnated woven fabric material 12 placed thereon. The distal ends 20 of the studs or pins allow separation of the fibers of the woven material upon penetration rather than any breaking of the strands which could weaken the ultimate product. As can be seen in FIG. 1, the studs or pins 18 extend beyond the thickness of the sheet when the sheet is penetrated by the studs or pins when positioned on the upper surface 16 of the base 14. The number of studs or pins, their relative spacing and general overall layout on the upper surface 16 of the base 14 is determined by the application or use of the finished perforated sheet 12.

To practice this invention, a woven fabric sheet 12 is impregnated with epoxy resin and allowed to dry (pre-pregged). The pre-pregged sheet is then heated (to facilitate penetration) and placed over the studs or pins 18. The studs or pins and upper surface 16 of the tool system 10 are coated with a suitable release material well known in this art. The woven fabric sheet 12 is then forced downward toward the upper surface 16 of the base 14 by means of a flexible pressure pad 22. The pressure pad 22 may be constructed of rubber or the like material. The woven fabric sheet adjacent surface 24 of the pad 22 has stud or pin mating indentations 26 for receiving the exposed portions of the studs or pins as pressure is applied to the pad and the sheet 12 is forced through the studs or pins toward the base upper surface 16.

The resin epoxy impregnated sheet of woven material is then partially cured while the required pad pressure is maintained. The partial curing of the epoxy resin is accomplished according to the manufacturer's specifications which generally requires an elevated temperature environment for a specific time period.

After partial cure, the woven sheet is then removed from the base 12 of the tool system 10. Because of the partially cured state, the apertures through the sheet 12 remain open in the shape or dimension of the studs or pins.

Figure 2:
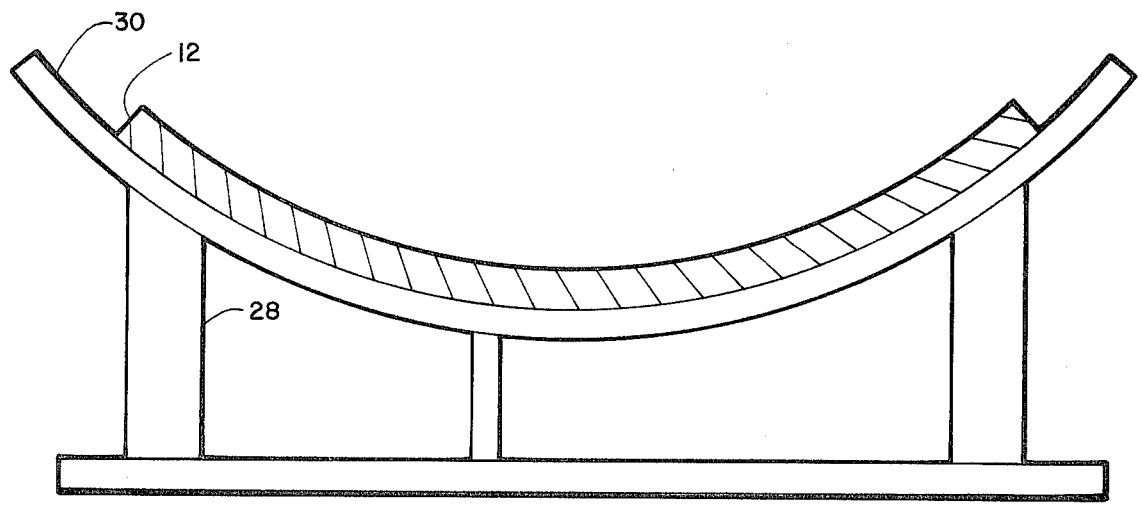
FIG. 2 is an end view schematic showing of a contoured fixture for the ultimate curing of the perforated laminate sheet to a desired contour.

The partially cured perforated woven sheet 12 is then placed upon a contoured curing fixture 28 as shown in FIG. 2. The upper surface 30 of the fixture 28 is in the form required for the ultimate use contour, of the sheet 12. The partially cured sheet 12 is now finally cured according to the manufacturer's specifications, typically under pressure to assist contour forming and final compaction of the laminate material.

It will be appreciated that while the upper surface 30 of the fixture 28 is shown as concave the invention is not so limited and the form of the surface 30 may be any desired. Further, the fixture 28 may provide for curving in the longitudinal direction of the surface 30 so as to able to provide a "Coke bottle" configuration as may be required in some instances.

By proper control of the partial cure and the selection of a low flow resin system, such as by way of example and not by way of limitation, E-767 manufactured by U.S. Polymeric, the apertures formed by the studs or pins 18 remain unblocked by resin flow during the final cure.

Although the invention has been described in connection with the details of producing a contoured graphite/epoxy resin laminate, it should be clearly understood that the process is equally applicable to materials other than graphite. The present invention, therefore, is not to be limited to the specific embodiment chosen for illustration, but is intended to cover all modifications and adaptations thereof.

What is claimed is:

1. In a method of manufacturing a contoured perforated composite laminate, comprising the steps of:
   providing a mold with a flat surface portion including a plurality of spaced apart rigid pins integral therewith projecting substantially perpendicular from the mold surface portion;
   coating the mold surface portion and pins with a mold release agent which will not substantially effect the material of a subsequently placed sheet thereon;
   impregnating a composite laminate structure with an epoxy resin which is allowed to dry;
   warming said composite laminate structure impregnated with the dried epoxy resin material;
   placing over the pins said warmed composite laminate structure;
   forcing the composite laminate structure against the mold surface portion by means of a pressure pad causing the pins to pass project through the composite laminate structure;
   partially curing the uncured composite laminate structure while held under pressure against the mold surface by the pad;
   removing the partially cured composite laminate structure from the flat mold surface;
   placing the partially cured composite laminate structure on a curing fixture having a desired contour; and
   completing the cure of said partially cured composite laminate structure.

2. The method of claim 1 wherein the laminate structure comprises a plurality of dry epoxy impregnated layers of woven material.

3. The method of claim 1 wherein the resin content of the epoxy is selected so that the viscosity is sufficiently high to substantially prevent flow after being partially cured.

* * * * *